US012780707B2

(12) United States Patent
Phenes et al.

(10) Patent No.: US 12,780,707 B2
(45) Date of Patent: Nov. 3, 2026

(54) METHODS AND APPARATUS FOR PROCESSING A GLASS RIBBON

(71) Applicant: CORNING INCORPORATED, Corning, NY (US)

(72) Inventors: Craig Marshall Phenes, DAnville, KY (US); Jason Thomas Templar, Beaver Dams, NY (US); Michael Timothy Walker, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 260 days.

(21) Appl. No.: 18/701,815

(22) PCT Filed: Nov. 3, 2022

(86) PCT No.: PCT/US2022/048798

§ 371 (c)(1),
(2) Date: Apr. 16, 2024

(87) PCT Pub. No.: WO2023/091304

PCT Pub. Date: May 25, 2023

(65) Prior Publication Data

US 2025/0223216 A1 Jul. 10, 2025

Related U.S. Application Data

(60) Provisional application No. 63/280,414, filed on Nov. 17, 2021.

(51) Int. Cl.
*C03B 17/06* (2006.01)
*C03B 33/023* (2006.01)
*C03B 33/037* (2006.01)

(52) U.S. Cl.
CPC .......... *C03B 17/06* (2013.01); *C03B 33/0235* (2013.01); *C03B 33/037* (2013.01)

(58) Field of Classification Search
None
See application file for complete search history.

(56) References Cited

U.S. PATENT DOCUMENTS 3,445,672 A 5/1969 Marks
4,492,477 A * 1/1985 Leser .................. G01N 21/896 356/239.8

(Continued)

FOREIGN PATENT DOCUMENTS

WO WO-0214229 A1 * 2/2002 ........... C03C 17/328
WO 2020/163054 A1 8/2020

OTHER PUBLICATIONS

WO-0214229-A1 Machine Translation by Clarivate Analytics retrieved Feb. 13, 2026. (Year: 2026).*

(Continued)

*Primary Examiner* — Lisa L Herring
(74) *Attorney, Agent, or Firm* — Kevin M. Able; Ye Eun Park

(57) ABSTRACT

Methods of processing a glass ribbon include moving the glass ribbon along a travel path in a travel direction. Methods include identifying a defect in the glass ribbon. Methods include virtually tagging a first segment of the glass ribbon including the defect. Methods include tracking the first segment as the first segment moves in the travel direction. Methods include separating the first segment from a portion of the glass ribbon upstream from the first segment relative to the travel direction. Based on the virtual tagging of the first segment, methods include segregating the first segment from a second segment of the glass ribbon including zero identified defects.

20 Claims, 7 Drawing Sheets

(56) References Cited

U.S. PATENT DOCUMENTS

| | | | | |
|---|---|---|---|---|
| 5,642,198 | A | 6/1997 | Long | |
| 6,972,422 | B2 | 12/2005 | Lee et al. | |
| 7,278,223 | B1 * | 10/2007 | Dever | B25H 7/04 33/666 |
| 7,283,227 | B2 | 10/2007 | Dureiko | |
| 7,551,274 | B1 | 6/2009 | Wornson et al. | |
| 7,567,344 | B2 | 7/2009 | Leblanc et al. | |
| 10,267,750 | B2 | 4/2019 | Vild et al. | |
| 2013/0078891 | A1 | 3/2013 | Lee et al. | |
| 2015/0299020 | A1 * | 10/2015 | Bao | C03B 33/10 428/137 |
| 2015/0375415 | A1 * | 12/2015 | Sausset | B26D 1/085 83/34 |
| 2016/0185647 | A1 * | 6/2016 | Vogt | C03C 3/095 83/881 |
| 2016/0311722 | A1 | 10/2016 | Ortner et al. | |
| 2019/0047895 | A1 | 2/2019 | Kuhn et al. | |
| 2021/0179474 | A1 | 6/2021 | Kurek et al. | |

OTHER PUBLICATIONS

International Search Report and Written Opinion of the International Searching Authority; PCT/US2022/048798 ; dated Mar. 10, 2023; 12 pages; KR Patent Office.

* cited by examiner

METHODS AND APPARATUS FOR PROCESSING A GLASS RIBBON

CROSS-REFERENCE TO RELATED APPLICATIONS

This is a national stage application under 35 U.S.C. § 371 of International Application No. PCT/US2022/048798, filed on Nov. 3, 2022, which claims the benefit of priority under 35 U.S.C. § 119 of U.S. Provisional Application Ser. No. 63/280,414 filed on Nov. 17, 2021, which are incorporated herein by reference in their entireties.

FIELD

The present disclosure relates generally to methods for processing a glass ribbon and, more particularly, to methods for processing a glass ribbon comprising identifying a defect in a segment of the glass ribbon and tracking the segment.

BACKGROUND

It is known to generate an image of a glass ribbon with a camera. The image is inspected to identify any defects within the glass ribbon. However, following the identification of defects, it has been difficult to track the position of the segment of the glass ribbon that comprises the defect. Further, it has been difficult to locate the defect-comprising segments of the glass ribbon at a location downstream from the camera. As a result, inspection of the glass ribbon for identified defects at a downstream location can be time-consuming and expensive.

SUMMARY

The following presents a simplified summary of the disclosure to provide a basic understanding of some aspects described in the detailed description.

In aspects, a processing apparatus can comprise a camera that can identify defects in a glass ribbon. Upon identifying a defect, the processing apparatus can virtually tag a segment of the glass ribbon that comprises the defect. The processing apparatus can track a position within the segment of the glass ribbon as the segment moves from the camera toward a scoring apparatus. The scoring apparatus can score the segment and a marking apparatus can physically apply a visible mark on the exterior surface of the segment. The visible mark is indicative of the presence of a defect in the segment. Following the application of the visible mark, the segment can be separated and moved toward an inspection location. At the inspection location, the segment, along with other segments, can be inspected for the presence or absence of visible marks (e.g., created by the marking apparatus). When a segment is identified as comprising a visible mark, the segment is segregated from the other segments that do not comprise visible marks. Accordingly, the segregated segment may be removed from production and the defect can be inspected by an operator or sent to a cullet.

In accordance with aspects, methods of processing a glass ribbon can comprise moving the glass ribbon along a travel path in a travel direction. Methods can comprise identifying a defect in the glass ribbon. Methods can comprise virtually tagging a first segment of the glass ribbon comprising the defect. Methods can comprise tracking the first segment as the first segment moves in the travel direction. Methods can comprise separating the first segment from a portion of the glass ribbon upstream from the first segment relative to the travel direction. Methods can comprise, based on the virtual tagging of the first segment, segregating the first segment from a second segment of the glass ribbon comprising zero identified defects.

In aspects, the tracking is commenced at a location along the travel path at which the defect is identified and terminated when the first segment is separated.

In aspects, methods can comprise generating a first virtual boundary of the first segment attached to the portion of the glass ribbon upstream from the first segment of the glass ribbon relative to the travel direction and a second virtual boundary of the first segment attached to a portion of the glass ribbon downstream from the first segment relative to the travel direction.

In aspects, the defect is located between the first virtual boundary and the second virtual boundary.

In aspects, methods can comprise scoring the glass ribbon at the first virtual boundary and the second virtual boundary.

In aspects, based on the virtual tagging of the first segment, methods can comprise creating a visible mark on a first major surface of the first segment prior to the separating.

In accordance with aspects, methods of processing a glass ribbon can comprise moving the glass ribbon along a travel path in a travel direction. Methods can comprise identifying a defect in the glass ribbon. Methods can comprise tracking a first segment of the glass ribbon comprising the defect as the first segment moves in the travel direction. Methods can comprise creating a visible mark on a first major surface of the first segment by contacting the first segment with a marking apparatus as the first segment moves relative to the marking apparatus. Methods can comprise detecting the visible mark on the first segment.

In aspects, the marking apparatus can comprise a soapstone material.

In aspects, methods can comprise tracking a second segment of the glass ribbon positioned adjacent to and upstream from the first segment relative to the travel direction, the second segment comprising zero identified defects.

In aspects, methods can comprise maintaining the marking apparatus a distance apart from the second segment as the second segment moves relative to the marking apparatus.

In aspects, methods can comprise separating the first segment from the second segment prior to detecting the visible mark on the first segment.

In aspects, methods can comprise, after detecting the visible mark on the first segment, segregating the first segment from the second segment.

In aspects, the tracking can commence at a location along the travel path at which the defect is identified and terminated when the first segment is separated.

In aspects, creating the visible mark can comprise moving the marking apparatus toward the glass ribbon along a movement axis that intersects the first major surface.

In aspects, creating the visible mark can comprise detecting a force applied by the marking apparatus on the first segment when the first segment is contacted with the marking apparatus. Methods can comprise maintaining the force within a predetermined range.

In accordance with aspects, methods of processing a glass ribbon can comprise moving the glass ribbon along a travel path in a travel direction. Methods can comprise identifying a defect in the glass ribbon. Methods can comprise tracking a first segment of the glass ribbon, which comprises the defect, as the first segment moves in the travel direction. Methods can comprise creating a visible mark on a first major surface of the first segment by contacting the first segment with a marking apparatus as the glass ribbon moves in the travel direction relative to the marking apparatus. The visible mark can extend along an axis in the travel direction.

In aspects, the first segment can comprise a first virtual boundary attached to a portion of the glass ribbon upstream from the first segment relative to the travel direction and a second virtual boundary attached to a portion of the glass ribbon downstream from the first segment relative to the travel direction. The visible mark can be positioned between the first virtual boundary and the second virtual boundary.

In aspects, the visible mark can be spaced a first distance from the first virtual boundary and a second distance from the second virtual boundary such that the axis intersects the first virtual boundary and the second virtual boundary.

In aspects, tracking the first segment can commence at a location along the travel path at which the defect is identified and can terminate after the visible mark is created.

In aspects, the defect can extend along a second axis that forms an angle relative to the axis, the angle within a range from about 80 degrees to about 100 degrees.

Additional features and advantages of the aspects disclosed herein will be set forth in the detailed description that follows, and in part will be clear to those skilled in the art from that description or recognized by practicing the aspects described herein, including the detailed description which follows, the claims, as well as the appended drawings. It is to be understood that both the foregoing general description and the following detailed description present aspects intended to provide an overview or framework for understanding the nature and character of the aspects disclosed herein. The accompanying drawings are included to provide further understanding and are incorporated into and constitute a part of this specification. The drawings illustrate various aspects of the disclosure, and together with the description explain the principles and operations thereof.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
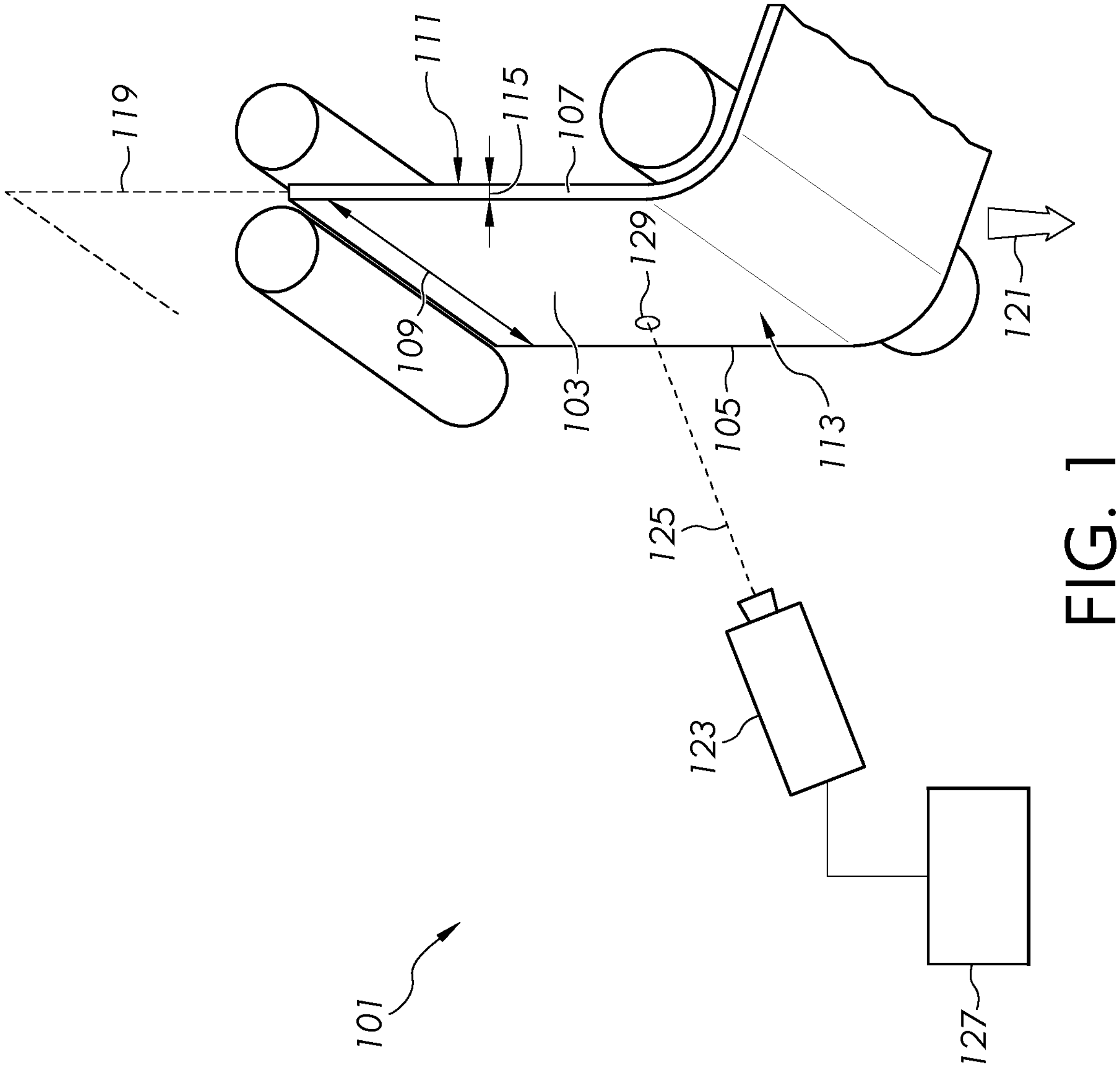
FIG. 1 schematically illustrates aspects of a processing apparatus comprising a camera that inspects a glass ribbon in accordance with aspects of the disclosure.

Aspects will now be described more fully hereinafter with reference to the accompanying drawings in which example aspects are shown. Whenever possible, the same reference numerals are used throughout the drawings to refer to the same or like parts. However, this disclosure may be embodied in many different forms and should not be construed as limited to the aspects set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, aspects include from the one value to the other value. Similarly, when values are expressed as approximations by use of the antecedent "about," it will be understood that the value forms another aspect. It will be further understood that the endpoints of each of the ranges are significant both in relation to the other endpoint, and independently of the other endpoint.

Directional terms as used herein—for example up, down, right, left, front, back, top, bottom, upper, lower, etc.—are made only with reference to the figures as drawn and are not intended to imply absolute orientation.

Unless otherwise expressly stated, it is in no way intended that any methods set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic relative to arrangement of steps, operational flow, order of components, or orientation of components; plain meaning derived from grammatical organization or punctuation, and; the number or type of aspects described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. The term "substantially" may denote values within about 10% of each other, such as within about 5% of each other, or within about 2% of each other.

Modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first end and a second end generally correspond to end A and end B or two different or two identical ends or the same end.

The present disclosure relates to a ribbon processing apparatus and methods of processing a ribbon. Methods and apparatus for processing a glass ribbon will now be described by way of example aspects for forming a glass ribbon from a quantity of molten material. As schematically illustrated in FIG. 1, a processing apparatus 101 is illustrated for processing a glass ribbon 103. As used herein, the processing apparatus 101 can process the glass ribbon 103 in several ways. For example, the processing apparatus 101 can inspect the glass ribbon 103 and detect the presence or absence of defects within the glass ribbon 103. Downstream from the inspection of the glass ribbon 103, the processing apparatus 101 can score and separate the glass ribbon 103 into discrete segments. The processing apparatus 101 can be configured to apply a visible mark to segments of the glass ribbon 103 that comprise defects. Moreover, the processing apparatus 101 may be configured to track the location of segments of the glass ribbon 103 that comprise defects as the segments move in a travel direction.

The glass ribbon 103 extends between a first outer edge 105 and a second outer edge 107. A width 109 of the glass ribbon 103 extends between the first outer edge 105 and the second outer edge 107. The width 109 may be greater than or equal to about 20 millimeters (mm), for example, greater than or equal to about 50 mm, for example, greater than or equal to about 100 mm, for example, greater than or equal to about 500 mm, for example, greater than or equal to about 1000 mm, for example, greater than or equal to about 2000 mm, for example, greater than or equal to about 3000 mm, for example, greater than or equal to about 4000 mm, although other widths less than or greater than the widths mentioned above may be provided in further aspects. For example, the width 109 of the glass ribbon 103 may be from about 20 mm to about 4000 mm, for example, from about 50 mm to about 4000 mm, for example, from about 100 mm to about 4000 mm, for example, from about 500 mm to about 4000 mm, for example, from about 1000 mm to about 4000 mm, for example, from about 2000 mm to about 4000 mm, for example, from about 3000 mm to about 4000 mm, for example, from about 20 mm to about 3000 mm, for example, from about 50 mm to about 3000 mm, for example, from about 100 mm to about 3000 mm, for example, from about 500 mm to about 3000 mm, for example, from about 1000 mm to about 3000 mm, for example, from about 2000 mm to about 3000 mm, for example, from about 2000 mm to about 2500 mm, and all ranges and subranges therebetween.

The glass ribbon 103 comprises a first major surface 111 and a second major surface 113 facing opposite directions. The glass ribbon 103 further comprises a thickness 115 between the first major surface 111 and the second major surface 113. The thickness 115 may be less than or equal to about 2 millimeters (mm), less than or equal to about 1 millimeter, less than or equal to about 0.5 millimeters, for example, less than or equal to about 300 micrometers (μm), less than or equal to about 200 micrometers, or less than or equal to about 100 micrometers, although other thicknesses may be provided in further aspects. For example, the thickness 115 of the glass ribbon 103 may be from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, from about 50 μm to about 100 μm, including all ranges and subranges of thicknesses therebetween. In addition, the glass ribbon 103 can comprise a variety of compositions comprising but not limited to, soda-lime glass, borosilicate glass, alumino-borosilicate glass, alkali-containing glass, or alkali-free glass. The glass ribbon 103 may be separated into discrete sheets or segments and may be processed into a desired application, e.g., a display application. For example, the separated segments can be used in a wide range of display applications, such as, for example, liquid crystal displays (LCDs), electrophoretic displays (EPD), organic light emitting diode displays (OLEDs), plasma display panels (PDPs), microLED displays, miniLED displays, organic light emitting diode lighting, light emitting diode lighting, augmented reality (AR), virtual reality (VR), touch sensors, photovoltaics, foldable phones, or other applications.

The glass ribbon 103 can move along a travel path 119 in a travel direction 121. In aspects, the processing apparatus 101 can comprise a camera 123 that is positioned to image a portion of the glass ribbon 103 as the glass ribbon 103 moves along the travel path 119. In aspects, the camera 123 can comprise an infrared camera that can detect infrared light and generate an image based on the detected infrared light. Based on the image generated by the camera 123, the processing apparatus 101 can detect the presence of defects that may be in the glass ribbon 103. The camera 123 may comprise a high-resolution area scan camera that can record images of the glass ribbon 103 at a rate of from about 2 frames per second to about 10 frames per second. The camera 123 is oriented such that a line of sight extends along an axis 125 between the camera 123 and the glass ribbon 103.

The processing apparatus 101 comprises a controller 127 that is coupled to the camera 123. The controller may comprise, for example, a multi-variable controller that can receive imaging data of the glass ribbon 103 from the camera 123. The controller 127 may comprise image processing software for evaluating generated images of the glass ribbon 103 and detecting defects 129 within the glass ribbon 103 based on the generated image. The controller 127 may further comprise a programmable automation controller that can determine one or more characteristics of the glass ribbon 103, such as a velocity of the glass ribbon 103 moving in the travel direction 121, size of the glass ribbon 103, defects 129 within the glass ribbon 103, a position of any defects 129 within the glass ribbon 103, size of the defects 129, type of defect, etc. The controller 127 may comprise a memory for storing information related to the glass ribbon 103, such as frequency of defects 129 over a given time period, types of defects 129 (e.g., inclusions, fault-lines, etc.), etc. The controller 127 may be coupled to a display, such that the information related to the glass ribbon 103 can be displayed and may be viewable by a user. Accordingly, methods of processing the glass ribbon 103 may comprise identifying one or more defects 129 in the glass ribbon 103.

Figure 2:
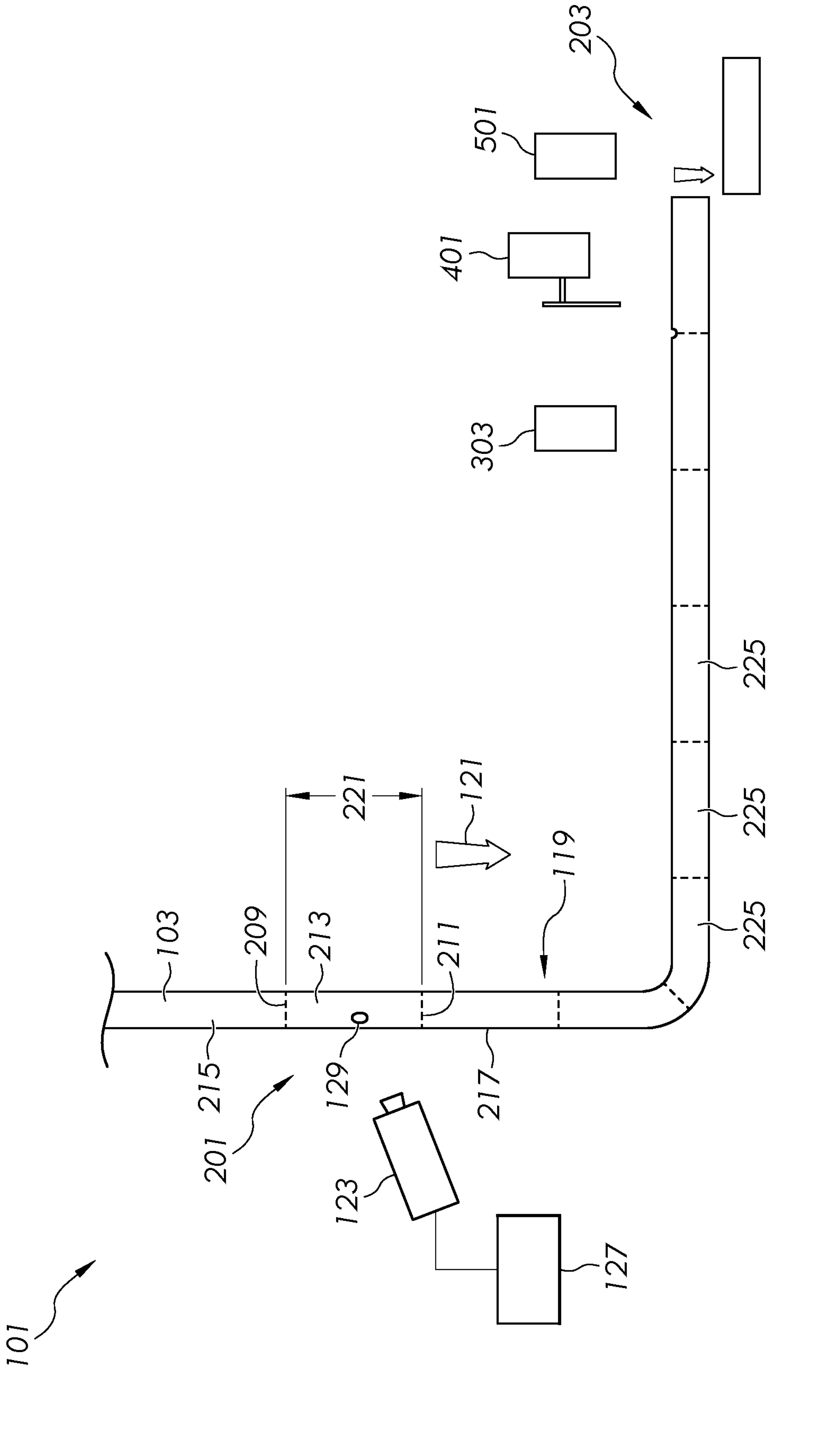
FIG. 2 illustrates a side view of the processing apparatus and a glass ribbon moving from an inspection location toward a separating location in accordance with aspects of the disclosure.

FIG. 2 illustrates a side view of the processing apparatus 101 and the glass ribbon 103. Methods of processing the glass ribbon 103 can comprise moving the glass ribbon 103 along the travel path 119 in the travel direction 121. The glass ribbon 103 may initially be in a continuous and non-separated form, extending from an inspection location 201 to a separating location 203 that is downstream from the inspection location 201 relative to the travel direction 121. The inspection location 201 comprises the location at which the camera 123 inspects the glass ribbon 103 for defects. The separating location comprises the location at which the glass ribbon 103 is separated into discrete segments. The controller 127 generates virtual boundaries for the glass ribbon 103, wherein the virtual boundaries are digital representations of physical locations within the glass ribbon 103 where the glass ribbon 103 is scored and separated. For example, methods of processing the glass ribbon 103 can comprise generating a first virtual boundary 209 of a first segment 213 that is attached to a portion 215 of the glass ribbon 103 that is upstream of the first segment 213 relative to the travel direction 121 and a second virtual boundary 211 of the first segment 213 attached to a portion 217 of the glass ribbon 103 that is downstream of the first segment 213 relative to the travel direction 121. The first virtual boundary 209 and the second virtual boundary 211 can comprise digital representations of physical locations within the glass ribbon 103 at which scoring and separating occur. For example, the first virtual boundary 209 and the second virtual boundary 211 may initially be scored and, following scoring, the first segment 213 may be separated at the first virtual boundary 209 and the second virtual boundary 211.

The first segment 213 comprises a length 221 that is the distance between the first virtual boundary 209 and the second virtual boundary 211. The length 221 may be selected by a user, for example, by providing the length 221 to the controller 127. Virtual boundaries for the glass ribbon 103 can be selected such that the glass ribbon 103 comprises a plurality of segments 225 that each comprise the same length (e.g., the length 221). In aspects, the defect 129 may be located within one or more segments of the glass ribbon 103. For example, as illustrated in FIG. 2, the defect 129 is located between the first virtual boundary 209 and the second virtual boundary 211 within the first segment 213. However, due to the selection of the positions of the virtual boundaries 209, 211 and/or the dimensions of the defect 129, the defect 129 may traverse one or more of the virtual boundaries 209, 211 and may lie within two or more adjacent segments.

Following the generation of the virtual boundaries 209, 211, methods can comprise virtually tagging the first segment 213 of the glass ribbon 103 comprising the defect 129. For example, by virtually tagging the first segment 213, the controller 127 may track the presence or absence of defects in the segments. The first segment 213 may be virtually tagged as a defect-comprising segment, while the other segments 225 that do not comprise defects may be virtually tagged as defect-free segments. The virtual tagging occurs electronically by the controller 127 and does not constitute physically marking of the glass ribbon 103, such that the virtual tagging comprises a digital representation of a segment that comprises the defect 129. The controller 127 may track one or more characteristics of the segments 213, 225, for example, a speed at which the glass ribbon 103 (e.g., and, thus, the segments 213, 225) is moving in the travel direction 121, the length 221 of the segments 213, 225, a position of the segments 213, 225 relative to the inspection location 201 and/or the separating location 203 at a certain point in time, the presence or absence of defects 129 within the segments 213, 225, characteristics of the defect 129 (e.g., type of defect, size of defect, position of the defect relative to the virtual boundaries, etc.). In aspects, when a defect is detected by the camera 123, the controller 127 may virtually tag (e.g., track, catalog, etc.) the segment as comprising the defect, such that the location of the first segment 213 with the defect 129 may be known.

Methods may further comprise tracking the first segment 213 (e.g., comprising the defect 129) as the first segment 213 moves in the travel direction 121. For example, by tracking the first segment 213, the controller 127 can monitor a position of the first segment 213 as the first segment 213 moves from the inspection location 201 to the separating location 203. In aspects, a speed of the glass ribbon 103 along the travel direction 121 may be determined, such as, for example, with a sensor. A distance between the inspection location 201 and the separating location 203 is also known. The controller 127 may be provided with the speed and the distance such that the position of the first segment 213 can be determined at a point in time, wherein the position may be indicative of the distance between the inspection location 201 and the first segment 213 or the distance between the first segment 213 and the separating location 203. The tracking may be commenced at a location along the travel path 119 at which the defect 129 is identified and may be terminated when the first segment 213 is separated. For example, the defect 129 may be initially detected by the camera 123 when the first segment 213 is in the inspection location 201. Tracking of the segments 213, 225 (e.g., with or without defects) may begin as the segments pass the camera 123 within the inspection location 201. The segments 213, 225 may continue to be tracked as the segments 213, 225 move between the inspection location 201 and the separating location 203. For example, initially, at time t=0, the first segment 213 may be at the camera 123 within the inspection location 201. As used herein, the first segment 213 is at the camera 123 when the first segment 213 is within the field of view of the camera 123. After a first period of time has passed, at time t=1, the first segment 213 may be between the inspection location 201 and the separating location 203. After a second period of time has passed, at time t=2, the first segment 213 may reach the separating location 203, whereupon the first segment 213 may be separated. The position of the first segment 213 may be tracked during these times such that an operator knows where the defect-comprising segments are located within the glass ribbon 103.

Figure 3:
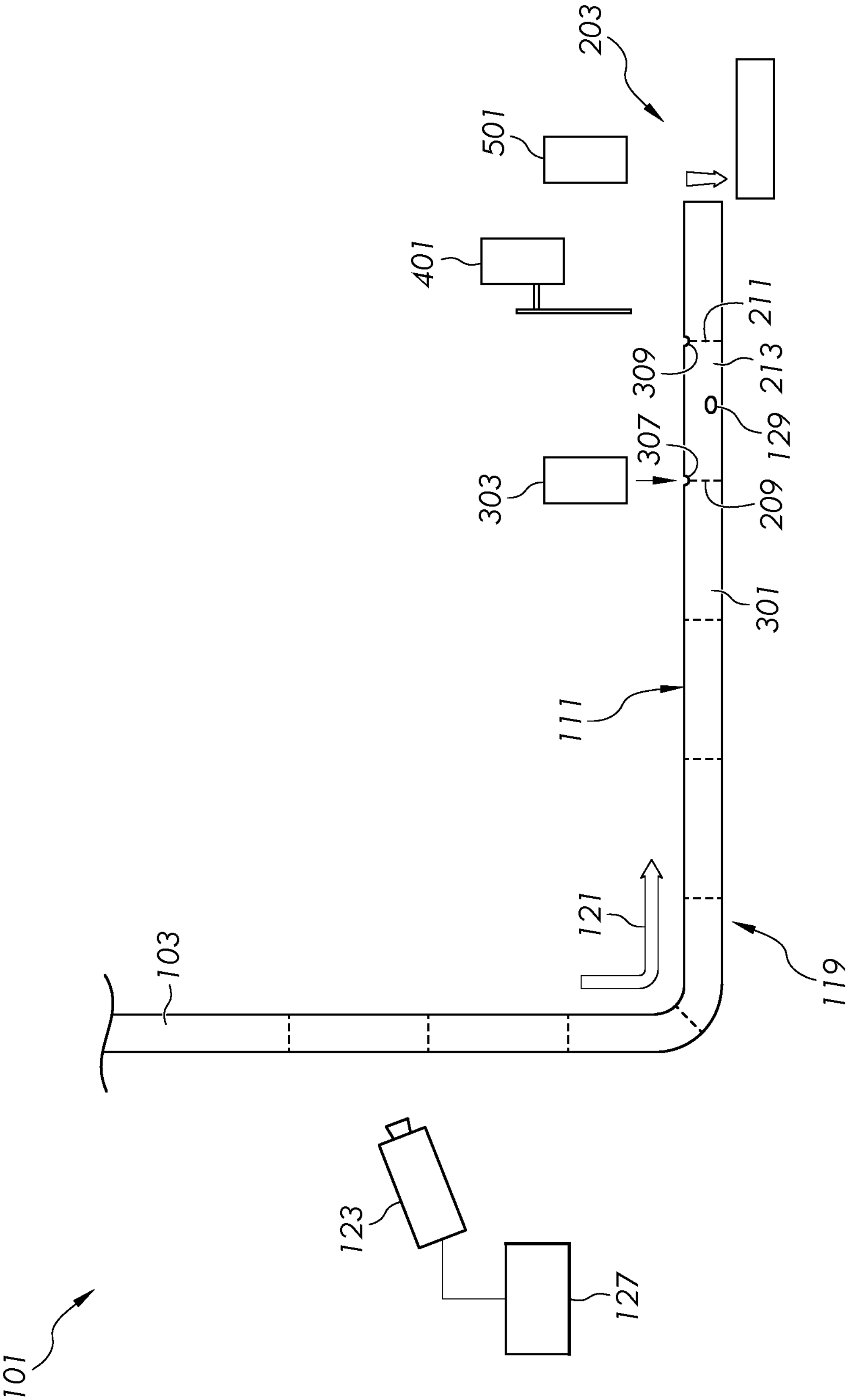
FIG. 3 illustrates a side view of the glass ribbon after a period of time has passed and a defect-containing segment has moved to a scoring apparatus to be scored in accordance with aspects of the disclosure.

FIG. 3 illustrates a side view of the processing apparatus 101 and the glass ribbon 103 after a period of time has passed following the inspection of the glass ribbon 103 by the camera 123 and the identification of the defect 129, wherein the first segment 213 has moved in the travel direction 121 from the inspection location 201. The controller 127 is not limited to tracking segments of the glass ribbon 103 that comprise defects but can also track segments that are free of defects. For example, methods can comprise tracking a second segment 301 of the glass ribbon positioned adjacent to and upstream from the first segment 213 relative to the travel direction 121, wherein the second segment 301 comprises zero identified defects. In aspects, the second segment 301 and the first segment 213 may be adjacent to one another and may share the first virtual boundary 209. By tracking the second segment 301, the controller 127 may determine a position of the second segment 301 relative to the first segment 213 and a distance between the second segment 301 and the inspection location 201 and/or the separating location 203.

Methods can comprise scoring the glass ribbon 103 at the virtual boundaries, for example, the first virtual boundary 209 and the second virtual boundary 211. For example, the processing apparatus 101 can comprise a scoring apparatus 303 positioned adjacent to the travel path 119 between the inspection location 201 and the separating location 203. The scoring apparatus 303 can comprise a laser or a mechanical apparatus (e.g., a wheel or scribing tool) such that the scoring can be accomplished by laser processing or mechanical processing. In aspects, the scoring apparatus 303 forms a groove in the first major surface 111 of the glass ribbon 103 at the virtual boundaries 209, 211. For example, as the glass ribbon 103 travels from the inspection location 201 toward the separating location 203, the glass ribbon 103 may travel past the scoring apparatus 303. The scoring apparatus 303 may form grooves 307, 309 in the first major surface 111 as the first segment 213 passes the scoring apparatus 303. For example, the scoring apparatus 303 may form a first groove 307 along the first virtual boundary 209 in the first major surface 111 when the first virtual boundary 209 passes the scoring apparatus 303. Likewise, the scoring apparatus 303 may form a second groove 309 along the second virtual boundary 211 when the second virtual boundary 211 passes the scoring apparatus 303. The scoring apparatus 303 can continue to form grooves in the glass ribbon 103 at the other virtual boundaries upstream from the first segment 213 as the virtual boundaries pass the scoring apparatus 303.

Figure 4:
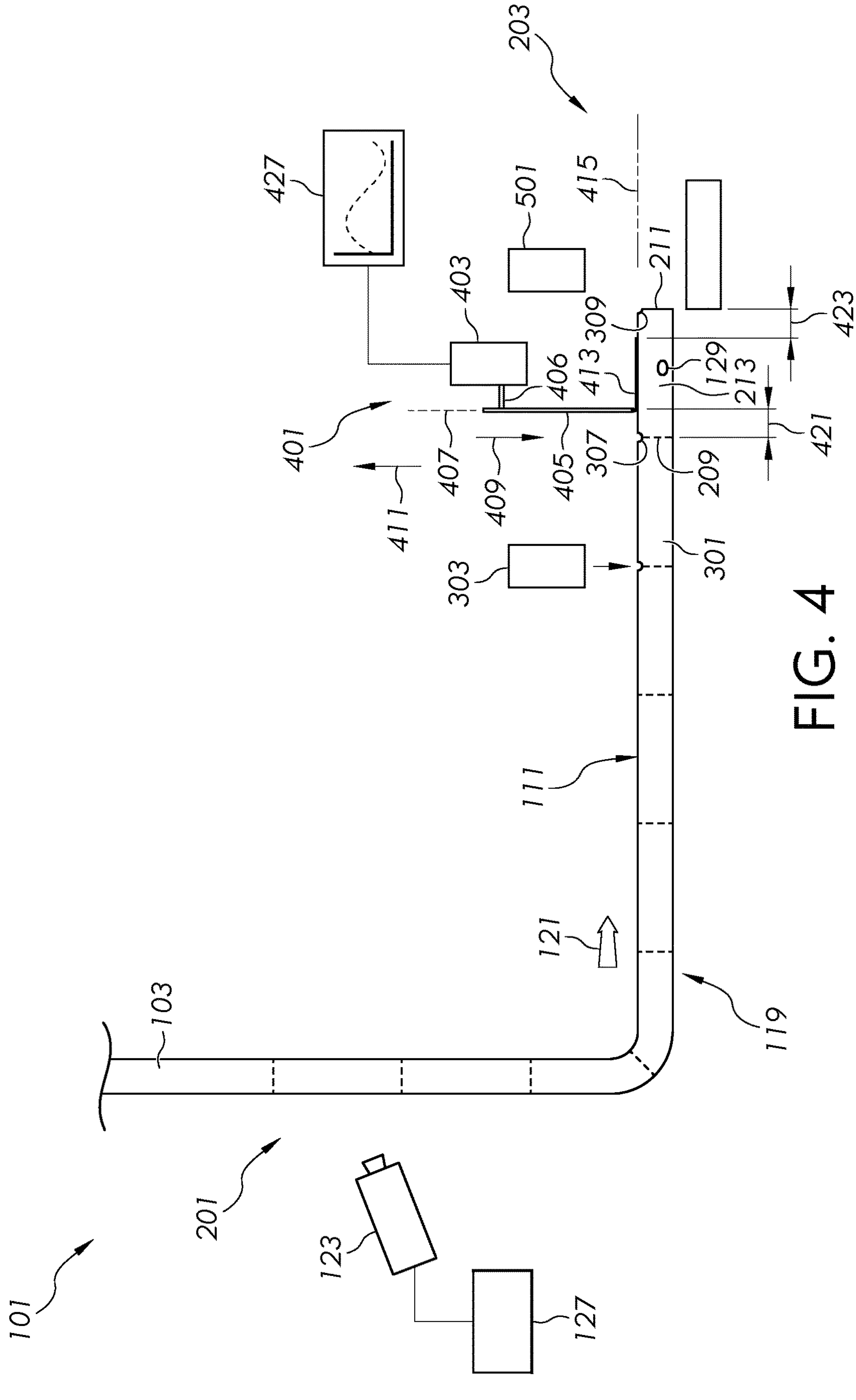
FIG. 4 illustrates a side view of the glass ribbon after a period of time has passed and the defect-containing segment has moved to a marking apparatus to be marked in accordance with aspects of the disclosure.

FIG. 4 illustrates a side view of the processing apparatus 101 and the glass ribbon 103 after the first segment 213 has moved in the travel direction 121 from the scoring apparatus 303 toward the separating location 203. The processing apparatus 101 comprises a marking apparatus 401 positioned adjacent to the travel path 119 between the scoring apparatus 303 and the separating location 203. The marking apparatus 401 is located downstream from the scoring apparatus 303 relative to the travel direction 121 such that the grooves 307, 309 are formed in the first major surface 111 prior to the first segment 213 reaching the marking apparatus 401. The marking apparatus 401 comprises a body 403 and a marker 405. The body 403 can comprise an actuator (e.g., a linear actuator and/or a rotary actuator) that can control movement of the marker 405. The marker 405 can be attached to the body 403 by an arm 406, such that the actuator can control movement of the arm 406, which can cause the marker 405 to move. The body 403 may further comprise machinery, electronics, a control apparatus, etc. that can facilitate control of the arm 406 and the marker 405. The marker 405 is movable along a movement axis 407, wherein the movement axis 407 intersects the glass ribbon 103. For example, the marker 405 can be moved in a movement direction 409 along the movement axis 407 toward the glass ribbon 103, whereupon the marker 405 can contact the first major surface 111 of the glass ribbon 103. The marker 405 can comprise a material that can apply a visible mark upon the first major surface 111, for example, a soapstone material. Due to the temperature of the glass ribbon 103 (e.g., about 450° C. in some aspects), the soapstone material is well-suited for creating a visible mark since the soapstone material can create the visible mark while not causing damage to the glass ribbon 103.

Based on the virtual tagging of the first segment 213, methods can comprise creating a visible mark 413 on the first major surface 111 of the first segment 213 prior to the separating of the first segment 213 at the separating location 203. For example, the virtual tagging of the first segment 213 indicates that the first segment 213 comprises the defect 129 (e.g., as identified by the camera 123). The position of the first segment 213 is tracked from the inspection location 201, such that when the first segment 213 reaches the marking apparatus 401, the marking apparatus 401 may be triggered to move the marker 405 along the movement axis 407 in the movement direction 409. For example, creating the visible mark 413 on the first major surface 111 comprises contacting the first segment 213 with the marker 405 of the marking apparatus 401 as the first segment 213 moves relative to the marking apparatus 401. Creating the visible mark 413 can comprise moving the marker 405 toward the glass ribbon 103 along the movement axis 407 that intersects the first major surface 111. As the glass ribbon 103 moves in the travel direction 121 relative to the marking apparatus 401, the visible mark 413 may extend along an axis 415 in the travel direction 121. The axis 415 may be substantially perpendicular to the movement axis 407.

In aspects, the visible mark 413 may be formed on the first segment 213 and may be positioned between the first virtual boundary 209 and the second virtual boundary 211. For example, as the first segment 213 passes the marking apparatus 401, the marker 405 may not be moved into contact with the first segment 213 until the second virtual boundary 211 has passed the movement axis 407. Once the second virtual boundary 211 passes the marker 405 and the movement axis 407, the marker 405 may be moved along the movement axis 407 in the movement direction 409 into contact with the first segment 213. The marker 405 may remain in contact with the first segment 213 as the first segment 213 moves in the travel direction 121 relative to the marking apparatus 401. Prior to the first virtual boundary 209 passing the marker 405 and the movement axis 407, the marker 405 may be moved along the movement axis 407 in a second movement direction 411 opposite the movement direction 409. By moving the marker 405 in the second movement direction 411, the marker 405 may be moved out of contact with the first segment 213, such that the marker 405 ceases contact with the first segment 213 prior to the first virtual boundary 209 passing the movement axis 407. As such, the visible mark 413 may be created on the first segment 213 while not crossing the virtual boundaries 209, 211 of the first segment 213. The visible mark 413 may be spaced a first distance 421 from the first virtual boundary 209 and a second distance 423 from the second virtual boundary 211 such that the axis 415 can intersect the first virtual boundary 209 and the second virtual boundary 211.

To ensure that a sufficient amount of force is applied by the marker 405 to the first major surface 111 to create the visible mark 413, methods can comprise detecting a force applied by the marking apparatus 401 on the first segment 213 when the first segment 213 is contacted with the marker 405 of the marking apparatus 401. For example, the marking apparatus 401 can comprise a sensor 427 that is coupled to one or more of the body 403, the marker 405, or the arm 406. The sensor 427 can detect the amount of force that is applied from the marker 405 to the glass ribbon 103. In aspects, methods can comprise maintaining the force within a predetermined range. For example, if the force applied by the marker 405 upon the first major surface 111 is below the predetermined range, then the marker 405 may not create the visible mark 413. If the force applied by the marker 405 upon the first major surface 111 is above the predetermined range, then the marker 405 may damage the glass ribbon 103 and/or cause the glass ribbon 103 to move in the movement direction 409. As such, the sensor 427 can facilitate maintaining the force within the predetermined range, such that the marker 405 can create the visible mark 413 without damaging the glass ribbon 103. When the sensor 427 detects that the force is above the predetermined range, then the sensor 427 can trigger the body 403 to move the marker 405 in the second movement direction 411, which can reduce the force. When the sensor 427 detects that the force is below the predetermined range, then the sensor 427 can trigger the body 403 to move the marker 405 in the movement direction 409, which can increase the force. In addition, the marker 405 may experience wear over time, which can cause a reduction in the length of the marker 405. To compensate for this length reduction, the arm 406 can move the marker 405 into contact with the glass ribbon 103 while still maintaining a force that is within the predetermined range. Further, when the marker 405 is reduced below a predetermined length (e.g., due to wear, use, breakage, etc.) and/or becomes inadvertently dislodged from the arm 406, then a force may fall below the predetermined range and an operator may be alerted.

Figure 5:
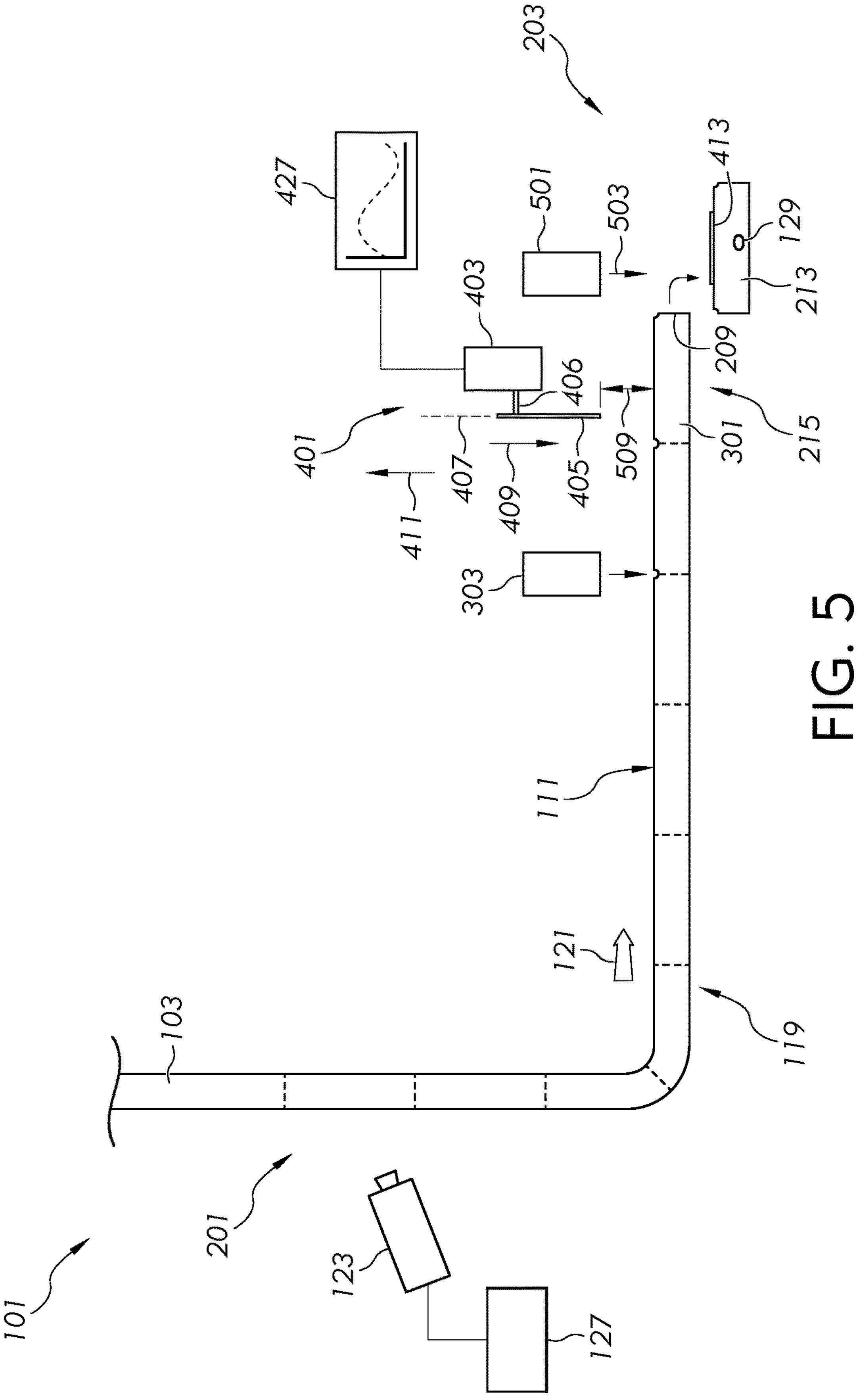
FIG. 5 illustrates a side view of the glass ribbon after a period of time has passed and the defect-containing segment has moved to a separating apparatus to be separated in accordance with aspects of the disclosure.

FIG. 5 illustrates a side view of the processing apparatus 101 and the glass ribbon 103 after the first segment 213 has been separated from the portion 215 of the glass ribbon 103 upstream from the first segment 213. In aspects, methods can comprise separating the first segment 213 from the portion 215 of the glass ribbon 103 upstream from the first segment 213 relative to the travel direction 121. For example, the processing apparatus 101 can comprise a separating apparatus 501 that can cause the first segment 213 to separate from the portion 215 (e.g., the second segment 301). The separating apparatus 501 is located downstream from the marking apparatus 401 relative to the travel direction 121. In aspects, the separating apparatus 501 can impact 503 the first segment 213 to cause the first segment 213 to separate. In aspects, the separating apparatus 501 can comprise a thermal source, such as a laser, that can create a thermal stress along the grooves 307, 309 at the virtual boundaries 209, 211. For example, the separating apparatus 501 can create a temperature gradient at the grooves 307, 309 of the virtual boundaries 209, 211, which can induce tensile stress that is sufficient to propagate a crack through the glass ribbon 103. In aspects, the separating apparatus 501 can exert a mechanical force upon the first segment 213 to facilitate separation of the first segment 213 along the virtual boundaries 209, 211.

Methods may further comprise separating the first segment 213 from the second segment 301 prior to detecting the visible mark 413 on the first segment 213. For example, the first segment 213 can be separated from the second segment 301 following the formation of the visible mark 413. As described relative to FIGS. 6-7, the first segment 213 can be inspected for the presence or absence of the visible mark 413. This inspection of the first segment 213 for the visible mark 413 may occur after the first segment 213 has been separated. In aspects, the marking apparatus 401 may be limited to creating visible marks on segments that contain a defect, while not creating visible marks on segments that are free of defects. For example, the second segment 301 may be free of defects such that no defects are identified in the second segment 301 by the camera 123. As such, the second segment 301 may not be virtually tagged as comprising a defect, but, rather, may be virtually tagged as being free of defects. In aspects, methods can comprise maintaining the marker 405 of the marking apparatus 401 a distance 509 apart from the second segment 301 as the second segment 301 moves relative to the marking apparatus 401. For example, after the marker 405 creates the visible mark 413 on the first segment 213, the marker 405 may move in the second movement direction 411 away from the glass ribbon 103. Due to the second segment 301 being free of defects, the marker 405 may be instructed to not create a visible mark on the second segment 301. As such, the marker 405 may remain the distance 509 away from the second segment 301 and may not contact the second segment 301.

Figure 6:
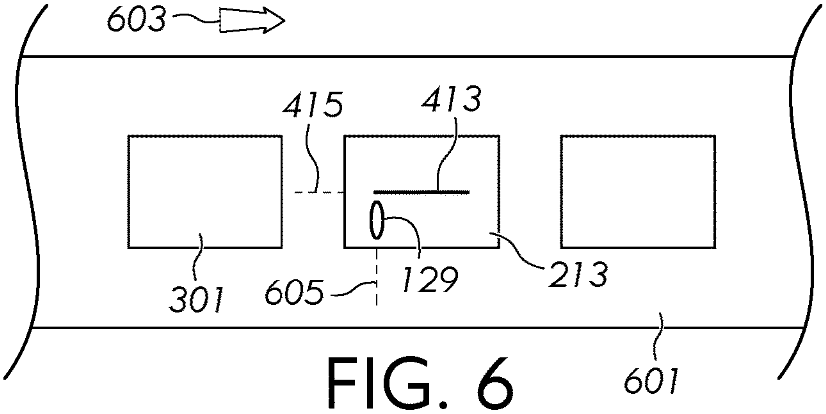
FIG. 6 illustrates a top-down view of segments of the glass ribbon following separation of the segments in accordance with aspects of the disclosure.

FIG. 6 illustrates a top-down view of segments 213, 301 of the glass ribbon 103 after separation. Following separation, the segments 213, 301 may rest upon and be conveyed by a conveyor 601 in a travel direction 603. In aspects, the defect 129 can extend along a second axis 605 that forms an angle relative to the axis 415 along which the visible mark 413 extends. For example, the angle may be within a range from about 80 degrees to about 100 degrees, or about 90 degrees. In aspects, the defect 129 may be formed as a result of contact between the first segment 213 and a roller prior to the first segment 213 passing the camera 123 (e.g., illustrated in FIG. 1). To differentiate the visible mark 413 from the defect 129, the visible mark 413 may be created to extend substantially perpendicular to the defect 129. The defect 129 is not limited to extending along the second axis 605, however. The defect 129 may comprise inclusions or fault-lines that extend along other axes. The segments 213, 301 may be spaced apart from one another on the conveyor 601 and may be separated by a gap or space between adjacent segments.

Figure 7:
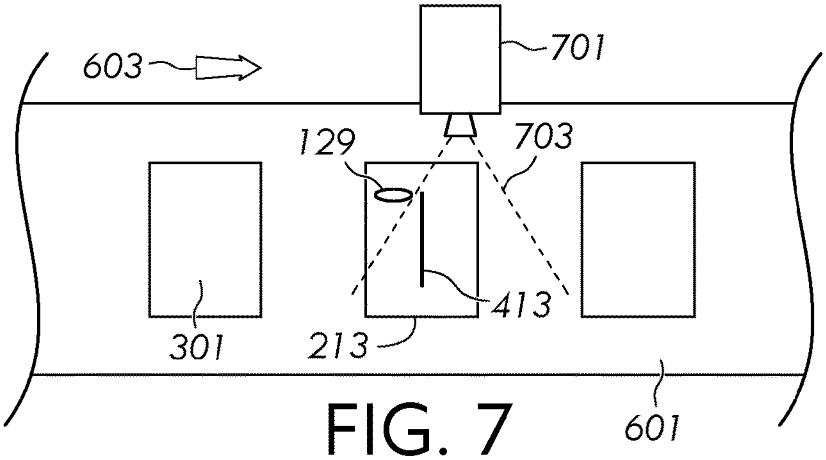
FIG. 7 illustrates a top-down view of segments of the glass ribbon as the segments are being inspected for visible marks by a camera in accordance with aspects of the disclosure.

FIG. 7 illustrates a top-down view of segments 213, 301 of the glass ribbon 103 as the segments 213, 301 are being inspected by a camera 701. In aspects, the camera 701 can be positioned above the conveyor 601 such that the segments 213, 301 can move relative to a field of view 703 of the camera 701. In aspects, prior to reaching the camera, the segments 213, 301 can be rotated. For example, referring to FIG. 6, the segments 213, 301 can be arranged in a first orientation. The segments 213, 301 can then be rotated 90 degrees in a clockwise direction, such that the segments 213, 301 may then be arranged in a second orientation, as illustrated in FIG. 7. After rotating the segments 213, 301, the segments 213, 301 may be moved by the conveyor 601 in the travel direction 603. The segments 213, 301 can be rotated in several ways, such as with robotic machinery, by an operator, etc. By rotating the segments 213, 301, the camera 701 may more easily recognize the presence or absence of visible marks 413. Additionally, by orienting the visible mark 413 in the illustrated direction, the likelihood of a false-positive (e.g., a non-mark being mistakenly identified as a visible mark by the camera 701) is reduced due to the unlikely occurrence of a defect or other mark being formed on a segment in the same position and orientation of the visible mark 413.

The camera 701 is positioned to image the segments 213, 301 and detect the presence or absence of the visible mark 413. In aspects, the camera 701 can comprise a camera that can record images of the segments 213, 301 at a rate of from about 2 frames per second to about 10 frames per second. The camera 701 can detect the contrast of the visible mark 413 relative to the surrounding portion of the segments 213, 301 that do not comprise a visible mark. In aspects, methods can comprise detecting the visible mark 413 on the first segment 213 with the camera 701. For example, the camera 701 can comprise the field of view 703 that is oriented toward a travel path along which the segments 213, 301 travel on the conveyor 601. The first segment 213 passes through the field of view 703, whereupon the camera 701 records an image of the first segment 213. The camera 701 can be coupled to a controller that can detect the presence of the visible mark 413. The controller can comprise, for example, a multi-variable controller with image processing software that can receive imaging data of the first segment 213 and evaluate the generated images. The first segment 213 may exit the field of view 703 followed by the second segment 301 entering the field of view 703. The second segment 301 may not comprise a visible mark, such that the camera 701 detects an absence of a visible mark. To facilitate easier recognition of the visible mark 413 by the camera 701, the visible marks created by the marking apparatus 401 on different segments may be substantially similar. For example, two different visible marks created on different segments may comprise substantially the same characteristics, for example, size (e.g., length, width), shape (e.g., elongated), position (e.g., distance from the edges of the segment), contrast (e.g, light versus dark contrast due to the soapstone material), and orientation (e.g., oriented in the same direction). In this way, the marking apparatus 401 may form substantially similar visible marks on different segments that comprise defects to increase the likelihood that the camera 701 detects the presence of the visible marks.

Figure 8:
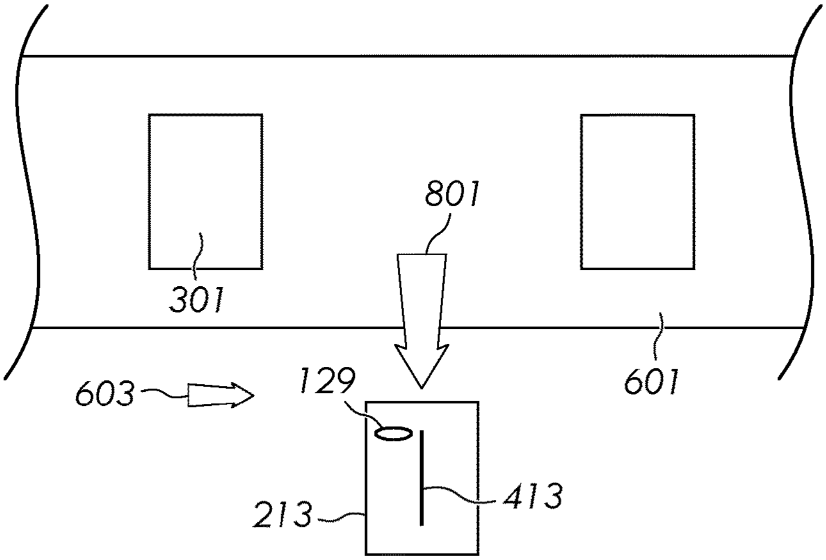
FIG. 8 illustrates a top-down view of segments of the glass ribbon as one of the segments is segregated due to the presence of a visible mark in accordance with aspects of the disclosure.

FIG. 8 illustrates a top-down view of segments 213, 301 after the segments 213, 301 have passed the camera 701. After detecting the visible mark 413 on the segments 213, 301, methods can comprise segregating (e.g., arrow 801) the first segment 213 from the second segment 301. For example, due to the detection of segments comprising visible marks by the camera 701, the segments that comprise visible marks may be segregated from the segments that do not comprise visible marks. As used herein, the segregation comprises setting apart the segments that comprise visible marks, for example, by grouping the segments that comprise visible marks in a first group and grouping the segments that do not comprise visible marks in a second group. As illustrated in FIG. 8, the first segment 213 may be segregated (e.g., arrow 801) by separating the first segment 213 from the second segment 301. As such, methods can comprise segregating the first segment 213 from the second segment 301 of the glass ribbon 103 comprising zero identified defects based on the virtual tagging of the first segment 213 and subsequent marking of the first segment 213. That is, the first segment 213 can be virtually tagged at the inspection location 201 (e.g., illustrated in FIG. 2) and based on the virtual tagging, the first segment 213 may be marked by the marking apparatus 401 (e.g., illustrated in FIG. 4), which allows the visible mark 413 to be detected by the camera 701 (e.g., illustrated in FIG. 7).

The first segment 213 comprising the detected visible mark 413 may be segregated in several ways. For example, an operator may be alerted to the location of the first segment 213 and the presence of the detected visible mark 413. As such, the operator may manually remove the first segment 213 from the conveyor 601, thus segregating the first segment 213 from the second segment 301. However, the segregation may not rely on an operator, but, rather, may be automated, for example, with pick-and-place machinery. For example, a machine apparatus downstream from the camera 701 may be alerted to the location of the first segment 213 and the presence of the detected visible mark 413. The first segment 213 may then be removed by the machine apparatus (e.g., comprising a pick-and-place robot) such that the first segment 213 is segregated. Segregation may be achieved by directing, via the conveyor 601, the defect-containing segments to a first location (e.g., a storage bin) and directing the defect-free segments to a second location. Following the segregation, the first segment 213 may be inspected. For example, the defect 129 within the first segment 213 may be inspected and characteristics related to the defect 129 may be determined (e.g., the type of defect, the size of the defect, the location of the defect, whether the identification of the defect was accurate, etc.).

Figure 9:
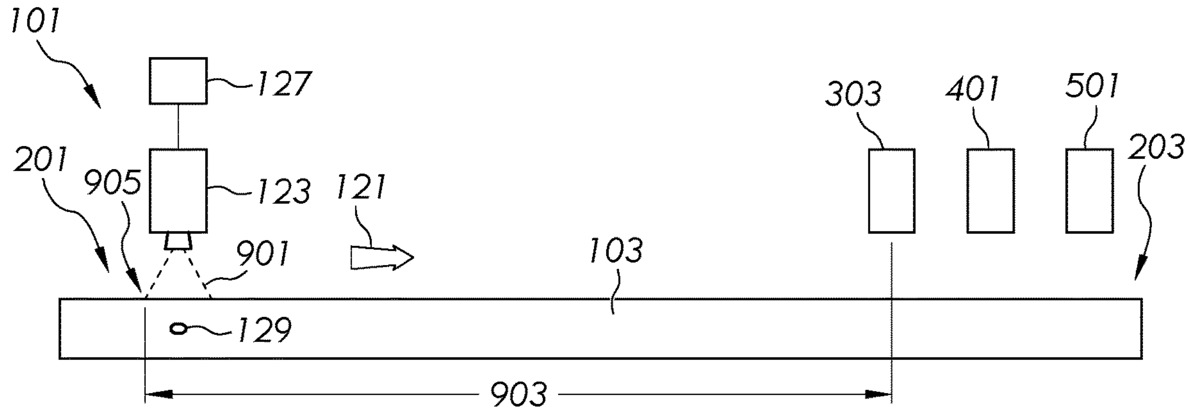
FIG. 9 illustrates a side view of the glass ribbon as the glass ribbon is tracked between an inspection location and a separating location in accordance with aspects of the disclosure.
Figure 10:
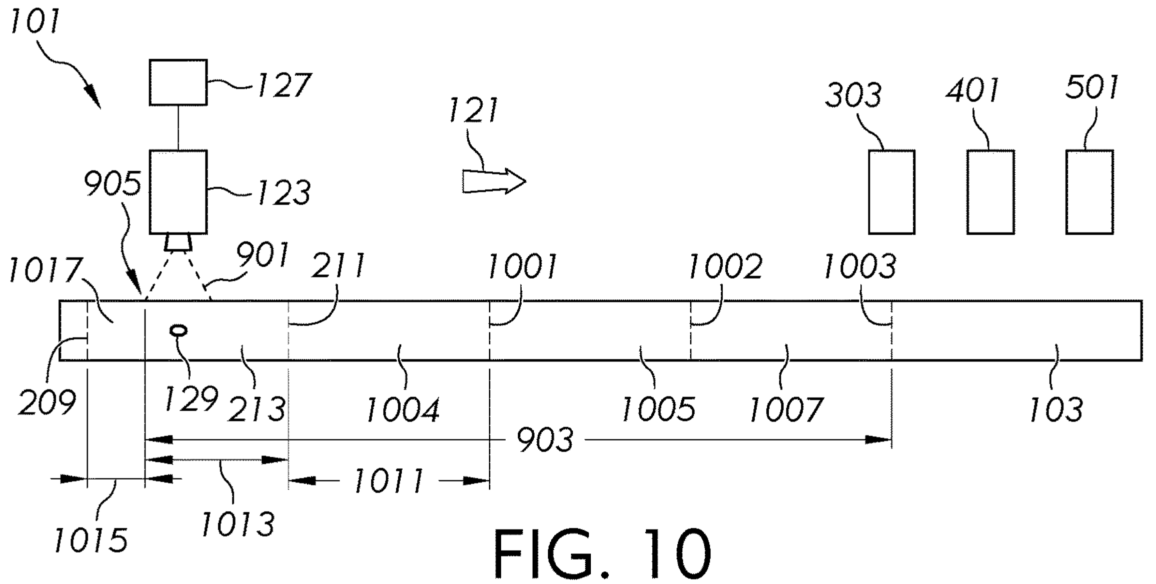
FIG. 10 illustrates a side view of the glass ribbon as virtual boundaries between segments are generated in accordance with aspects of the disclosure.
Figure 11:
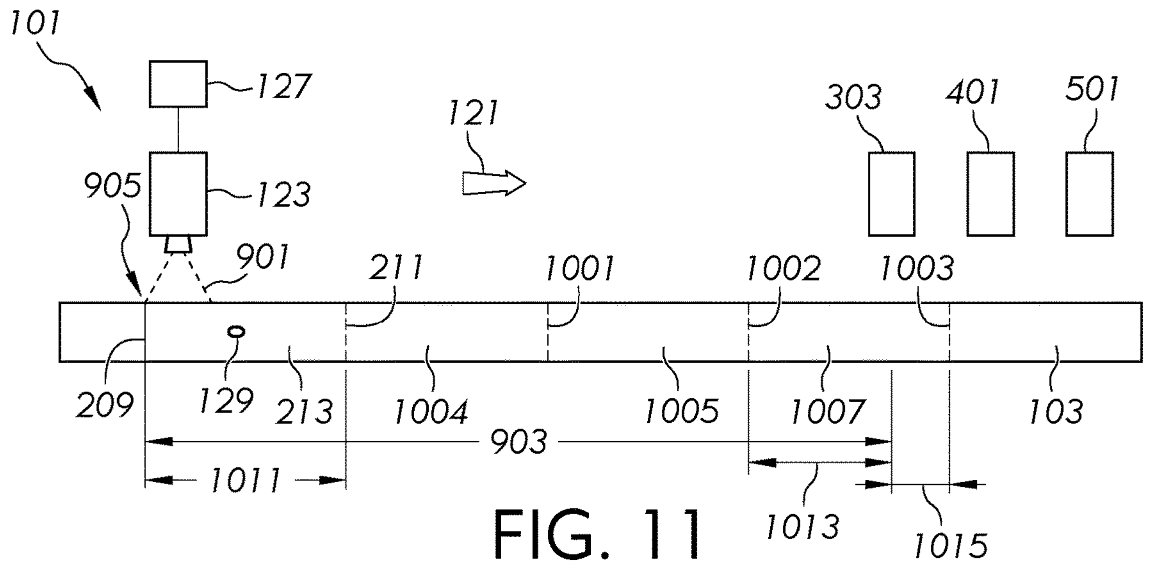
FIG. 11 illustrates a side view of the glass ribbon as the segments are tracked while moving toward the separating location in accordance with aspects of the disclosure.

Referring to FIGS. 9-11, methods of tracking the first segment 213 and synchronizing the scoring of the virtual boundaries 209, 211 are illustrated. FIG. 9 illustrates a side view of the glass ribbon 103 extending between the inspection location 201 and the separating location 203. While FIG. 9 illustrates the glass ribbon 103 as extending along a substantially linear travel path, the glass ribbon 103 can extend along a non-linear travel path between the inspection location 201 and the separating location 203 as illustrated in FIGS. 1-8. The glass ribbon 103 travels in the travel direction 121 past the camera 123 within a field of view 901 of the camera 123. An operator can initially select lengths of the segments of the glass ribbon 103, wherein the lengths are initially defined between virtual boundaries prior to the separating at the separating location 203. Once the desired lengths of the segments are selected, the scoring apparatus 303, the marking apparatus 401, and the separating apparatus 501 can be provided with control instructions that control and synchronize the operation of the scoring apparatus 303, the marking apparatus 401, and the separating apparatus 501 with the virtual boundaries of the glass ribbon 103. For example, a path length 903 of the glass ribbon 103 is initially known, with the path length 903 comprising the distance between the field of view 901 and the scoring apparatus 303. In aspects, the path length 903 may extend between an end 905 of the field of view 901 at which the glass ribbon 103 initially enters the field of view 901, and the location at which the scoring apparatus 303 scores the glass ribbon 103. In addition, a speed at which the glass ribbon 103 is moving from the field of view 901 to the scoring apparatus 303 is initially known. The speed of the glass ribbon 103 may be determined by one or more sensors and may be continuously monitored and inputted to a control apparatus, for example, the controller 127 coupled to the camera 123. Accordingly, with the path length 903 and the speed known, a position of any defects identified by the camera 123 at a given point in time may be determined.

Referring to FIG. 10, virtual boundaries 209, 211, 1001, 1002, 1003 within the glass ribbon 103 can be generated (e.g., by the controller 127). The virtual boundaries 209, 211, 1001, 1002, 1003 may be digital representations of physical locations at which the glass ribbon 103 can be scored and separated to form separated segments of the glass ribbon 103. For example, the glass ribbon 103 comprises the first segment 213 that is bounded by the first virtual boundary 209 and the second virtual boundary 211. The glass ribbon 103 may further comprise a second segment 1004, a third segment 1005, a fourth segment 1007, etc. The second segment 1004, the third segment 1005, and the fourth segment 1007 may be located downstream from the first segment 213 relative to the travel direction 121 of the glass ribbon 103. In aspects, the second segment 1004, the third segment 1005, and the fourth segment 1007 may be bounded by the virtual boundaries 1001, 1002, 1003. The virtual boundaries 209, 211, 1001, 1002, 1003 can be selected and generated based on a desired segment length of the segments 213, 1004, 1005, 1007. For example, in aspects, the segments 213, 1004, 1005, 1007 can comprise a substantially identical segment length 1011. The segment length 1011 may be measured between the virtual boundaries 209, 211, 1001, 1002, 1003 of each of the segments 213, 1004, 1005, 1007.

The path length 903 may or may not be evenly divisible by the segment length 1011. For example, if the path length 903 is 4000 mm and the segment length 1011 is 1000 mm, then the path length 903 is evenly divisible by the segment length 1011 and there are four segments between the field of view 901 and the scoring apparatus 303. For example, a virtual boundary of one of the segments may be located at the end 905 of the field of view 901 and a virtual boundary of another of the segments may be located at the scoring apparatus 303. However, the path length 903 may not be evenly divisible such that a remainder may exist after generating the virtual boundaries 209, 211, 1001 for the segments 213, 1004, 1005, 1007. For example, as illustrated in FIG. 10, if the path length 903 is 3750 mm and the segment length is 1000 mm, then the path length 903 is not evenly divisible by the segment length 1011 and a portion of a segment may lie upstream from the end 905 of the field of view 901. That is, there may be three full segments (e.g., segments 1004, 1005, 1007) between the field of view 901 and the scoring apparatus 303, and a portion of the first segment 213.

When the path length 903 is not evenly divisible by the segment length 1011, the first segment 213 may comprise a remainder portion 1017 that lies upstream of the end 905 such that the segment length 1011 of the first segment 213 comprises a first remainder length 1013 and a second remainder length 1015. For example, the first remainder length 1013 may lie between the end 905 of the field of view 901 and the second virtual boundary 211 of the first segment 213. The second remainder length 1015 may lie between the end 905 of the field of view 901 and the first virtual boundary 209 of the first segment 213. Accordingly, the remainder portion 1017 of the first segment 213 corresponding to the second remainder length 1015 may lie outside of the field of view 901 and upstream from the path length 903 relative to the travel direction 121.

Referring to FIGS. 10-11, the scoring apparatus 303 can be synchronized with the virtual boundaries 209, 211, 1001 to accommodate for the remainder portion 1017 and ensure that scoring occurs at the virtual boundaries 209, 211, 1001. For example, as illustrated in FIG. 10, the first virtual boundary 209 has not yet reached the end 905 of the field of view 901. FIG. 11 illustrates the glass ribbon 103 after a period of time has passed such that the first virtual boundary 209 has reached the end 905. Due to the presence of the remainder portion 1017, a virtual boundary is not at the scoring apparatus 303 at the time that the first virtual boundary 209 is at the end 905 of the field of view 901.

To ensure that the scoring apparatus 303 is synchronized with the camera 123 and the virtual boundaries 209, 211, 1001, 1002, 1003, a delay may be implemented that creates a delay between the scoring of the scoring apparatus 303 and when a virtual boundary reaches the end 905. The purpose of the delay is so that the end 905 of the field of view 901 is the origin, such that the scoring location is not the origin. For example, the delay can be based on the first remainder length 1013 and the second remainder length 1015. For the next score line (e.g., the first virtual boundary 209) to be at the origin (e.g., the end 905), the delay is implemented (e.g., 1 minus the second remainder length 1015) after a score is completed by the scoring apparatus 303. As a result, this phase offset of the score is used so that the system may know the distance from the location of the glass ribbon 103 that is at the end 905 to the next virtual boundary. This information may be transmitted to the controller 127 such that the defect position of a defect within a segment can be captured. In aspects, a distance across the glass ribbon 103 can be determined by camera pixel count. A benefit of synchronizing the scoring apparatus 303 with the camera 123 and the virtual boundaries 209, 211, 1001, 1002, 1003 is that every time scoring occurs, information is transmitted to the camera 123 and the controller 127 that allows the length of the segments to be tracked and maintained at a predetermined length. In addition, accumulated errors can be reduced or avoided over a length of the glass ribbon 103.

The time (e.g., "T") that passes between the scoring apparatus 303 scoring the virtual boundaries may be determined based on the speed (e.g., "V") at which the glass ribbon 103 is moving multiplied by the segment length 1011 (e.g., "L"), such that the time between scores (e.g., "T") is represented by the equation $T=L/V$. That is, the time that passes between the scoring apparatus 303 scoring the second virtual boundary 211 and the first virtual boundary 209 may be represented by the equation $T=L/V$. For example, if the segment length 1011 (e.g., "L") is about 1000 mm and the speed (e.g., "V") of the glass ribbon 103 is about 500 mm/second, then the time between scores is equal to about 2 seconds. In aspects, the delay time (e.g., "DT") can be calculated based on the time T and the first remainder length 1013 (e.g., "FRL"). For example, the delay time can be represented by the equation $DT=T*(1-FRL)$. If the first remainder length 1013 (e.g., FRL) is 750 mm (or 0.75 m), then the second remainder length 1015 is 250 mm (or 0.725 m). Accordingly, the delay time can be calculated as $DT=(2\ \text{seconds})*(1-0.75)$, which produces a delay time (DT) of 0.5 seconds.

Once the delay time has been determined, it may be known how long to delay the scoring once a virtual boundary has reached the end 905. For example, as illustrated in FIG. 11, when the first virtual boundary 209 reaches the end 905, there is not a virtual boundary located at the scoring apparatus 303. Accordingly, a delay may be implemented to wait a period of time after the first virtual boundary 209 passes the end 905 before scoring such that the scoring apparatus 303 can score the glass ribbon at the virtual boundary 1002. The delay time (DT) represents the amount of time that has passed since the last virtual boundary 1003 has passed the scoring apparatus 303. Therefore, once the first virtual boundary 209 reaches the end 905, the scoring apparatus 303 may be delayed 1.5 seconds (e.g., 2 seconds-0.5 seconds) before scoring again, thus ensuring that the next score occurs at the virtual boundary 1002. In this way, once a virtual boundary enters the end 905 of the field of view 901, the scoring apparatus 303 may be instructed to wait 1.5 seconds prior to scoring again.

Due to the known quantities of the path length 903, the segment length 1011, and the speed (e.g., "V") of the glass ribbon 103, the first segment 213 comprising the defect 129 may be tracked and the position of the first segment 213 may be known at any point in time. For example, when the speed (e.g., "V") of the glass ribbon 103 is about 500 mm/second, the segment length 1011 is about 1000 mm, and the path length 903 is about 3750 mm, then it may be determined that 3 seconds after the first virtual boundary 209 reaches the end 905 of the field of view 901, the first virtual boundary 209 may be located about 1500 mm from the field of view 901 along the travel path. The processing apparatus 101 can therefore determine the time at which the first segment 213 will reach the scoring apparatus 303 and the marking apparatus 401. The processing apparatus 101 can further track the first segment 213 after the first segment 213 passes the scoring apparatus 303. For example, the processing apparatus 101 can determine the position of the first segment 213, in particular, the first virtual boundary 209 and the second virtual boundary 211, at a point in time after the first segment 213 has passed the scoring apparatus 303 and the virtual boundaries 209, 211 have been scored. Instructions may therefore be provided to the marking apparatus 401 to create the visible mark 413 on the first segment 213 once the second virtual boundary 211 has reached the marking apparatus 401. Accordingly, methods can comprise tracking the first segment 213 such that the tracking is commenced at a location along the travel path at which the defect 129 is identified (e.g., at the inspection location 201) and terminated after the visible mark 413 is created (e.g., at the marking apparatus 401).

By tracking the glass ribbon 103 and marking the segments 213 that comprise defects 129, several benefits can be achieved. For example, the tracking of the glass ribbon 103 can be automated based on the known speed of the glass ribbon and the time that has elapsed since a particular segment has passed the camera 123. By automating the tracking, the location of a defect-containing segment within the glass ribbon 103 may be known. Further, the defect-containing segment can be marked upon reaching the marking apparatus 401, such that upon creating the visible mark 413 and separating the segments, tracking may no longer occur. Instead of tracking the segments following the separation, the camera 701 can inspect the segments for the presence of the visible marks 413. As such, when the camera 701 detects a segment comprising a visible mark, the defect-containing segment may be segregated from segments that do not contain defects.

It should be understood that while various aspects have been described in detail relative to certain illustrative and specific examples thereof, the present disclosure should not be considered limited to such, as numerous modifications and combinations of the disclosed features are possible without departing from the scope of the following claims.

What is claimed is:

1. A method of processing a glass ribbon comprising:

moving the glass ribbon along a travel path in a travel direction;

identifying a defect in the glass ribbon;

upon identifying the defect, virtually tagging a first segment of the glass ribbon comprising the defect, wherein the virtually tagging comprises defining a first virtual boundary upstream of the first segment and a second virtual boundary downstream of the first segment, the first and second virtual boundaries defining the first segment having the defect;

tracking the first segment as the first segment moves in the travel direction based on the defined first and second virtual boundaries;

separating the first segment from a portion of the glass ribbon upstream from the first segment relative to the travel direction; and based on the virtual tagging of the first segment, segregating the first segment from a second segment of the glass ribbon comprising zero identified defects.

2. The method of claim 1, wherein the tracking is commenced at a location along the travel path at which the defect is identified and terminated when the first segment is separated.

3. The method of claim 1, wherein the first virtual boundary of the first segment is attached to the portion of the glass ribbon upstream from the first segment of the glass ribbon relative to the travel direction, and the second virtual boundary of the first segment is attached to a portion of the glass ribbon downstream from the first segment relative to the travel direction.

4. The method of claim 3, wherein the defect is located between the first virtual boundary and the second virtual boundary.

5. The method of claim 3, further comprising scoring the glass ribbon at the first virtual boundary and the second virtual boundary.

6. The method of claim 1, further comprising, based on the virtual tagging of the first segment, creating a visible mark on a first major surface of the first segment prior to the separating.

7. A method of processing a glass ribbon comprising:

moving the glass ribbon along a travel path in a travel direction;

identifying a defect in the glass ribbon;

tracking a first segment of the glass ribbon comprising the defect as the first segment moves in the travel direction;

based on the tracking of the first segment, creating a visible mark on a first major surface of the first segment by physically contacting the first segment with a marking apparatus as the first segment moves relative to the marking apparatus, wherein the marking apparatus is maintained spaced apart from the glass ribbon until the first segment reaches a marking location and is then moved into contact with the first major surface to create the visible mark; and detecting the visible mark on the first segment and identifying the first segment as part of the glass ribbon processing.

8. The method of claim 7, wherein the marking apparatus comprises a soapstone material.

9. The method of claim 7, further comprising tracking a second segment of the glass ribbon positioned adjacent to and upstream from the first segment relative to the travel direction, the second segment comprising zero identified defects.

10. The method of claim 9, further comprising maintaining the marking apparatus a distance apart from the second segment as the second segment moves relative to the marking apparatus.

11. The method of claim 10, further comprising separating the first segment from the second segment prior to detecting the visible mark on the first segment.

12. The method of claim 11, further comprising, after detecting the visible mark on the first segment, segregating the first segment from the second segment.

13. The method of claim 11, wherein the tracking is commenced at a location along the travel path at which the defect is identified and terminated when the first segment is separated.

14. The method of claim 7, wherein the creating the visible mark comprises moving the marking apparatus toward the glass ribbon along a movement axis that intersects the first major surface.

15. The method of claim 14, wherein the creating the visible mark comprises:

detecting a force applied by the marking apparatus on the first segment when the first segment is contacted with the marking apparatus; and maintaining the force within a predetermined range.

16. A method of processing a glass ribbon comprising:

moving the glass ribbon along a travel path in a travel direction;

identifying a defect in the glass ribbon;

tracking a first segment of the glass ribbon, which comprises the defect, as the first segment moves in the travel direction; and creating a visible mark on a first major surface of the first segment by contacting the first segment with a marking apparatus as the glass ribbon moves in the travel direction relative to the marking apparatus, the visible mark extending along an axis in the travel directions, wherein the tracking the first segment is commenced at a location along the travel path at which the defect is identified and terminated after the visible mark is created.

17. The method of claim 16, wherein the first segment comprises a first virtual boundary attached to a portion of the glass ribbon upstream from the first segment relative to the travel direction and a second virtual boundary attached to a portion of the glass ribbon downstream from the first segment relative to the travel direction, the visible mark positioned between the first virtual boundary and the second virtual boundary.

18. The method of claim 17, wherein the visible mark is spaced a first distance from the first virtual boundary and a second distance from the second virtual boundary such that the axis intersects the first virtual boundary and the second virtual boundary.

19. The method of claim 16, wherein the defect extends along a second axis that forms an angle relative to the axis, the angle within a range from about 80 degrees to about 100 degrees.

20. A method of processing a glass ribbon comprising:

moving the glass ribbon along a travel path in a travel direction;

identifying a defect in the glass ribbon;

tracking a first segment of the glass ribbon comprising the defect as the first segment moves in the travel direction;

creating a visible mark on a first major surface of the first segment by contacting the first segment with a marking apparatus as the first segment moves relative to the marking apparatus;

detecting the visible mark on the first segment;

tracking a second segment of the glass ribbon positioned adjacent to and upstream from the first segment relative to the travel direction, the second segment comprising zero identified defects; and separating the first segment from the second segment prior to detecting the visible mark on the first segment.

* * * * *